United States Patent
Kapoor et al.

(10) Patent No.: US 11,163,346 B2
(45) Date of Patent: Nov. 2, 2021

(54) RECYCLING CAPACITANCE ENERGY FROM ACTIVE MODE TO LOW POWER MODE

(71) Applicant: NXP B.V., Eindhoven (NL)

(72) Inventors: Ajay Kapoor, Eindhoven (NL); Kristof Blutman, Eindhoven (NL); Juan Diego Echeverri Escobar, Noord Brabant (NL); Jose de Jesus Pineda de Gyvez, Eindhoven (NL); Jurgen Geerlings, Eindhoven (NL); Hamed Fatemi, Eindhoven (NL)

(73) Assignee: NXP B.V., San Jose, CA (US)

( * ) Notice: Subject to any disclaimer, the term of this patent is extended or adjusted under 35 U.S.C. 154(b) by 244 days.

(21) Appl. No.: 16/118,749

(22) Filed: Aug. 31, 2018

(65) Prior Publication Data

US 2020/0073453 A1    Mar. 5, 2020

(51) Int. Cl.
| | | |
|---|---|---|
| *G06F 1/26* | (2006.01) | |
| *G06F 1/32* | (2019.01) | |
| *H02M 3/07* | (2006.01) | |
| *H02M 3/137* | (2006.01) | |

(52) U.S. Cl.
CPC .............. *G06F 1/26* (2013.01); *H02M 3/07* (2013.01); *H02M 3/137* (2013.01)

(58) Field of Classification Search
CPC ............ G06F 1/26; G06F 1/3287; G06F 1/32; H02M 3/07; H02M 3/137; H02M 2001/0032; H02M 2001/0045; H02M 2001/0035
See application file for complete search history.

(56) References Cited

U.S. PATENT DOCUMENTS

| | | |
|---|---|---|
| 2002/0190797 A1 | 12/2002 | Deppe et al. |
| 2010/0188061 A1* | 7/2010 | Ma ........................ H02M 3/158 323/247 |

(Continued)

FOREIGN PATENT DOCUMENTS

| | | |
|---|---|---|
| EP | 2302775 A1 | 3/2011 |
| WO | WO-2010/084444 A2 | 7/2010 |

OTHER PUBLICATIONS

Voltage regulator, Wikipedia, 2009 (Year: 2009).*

(Continued)

*Primary Examiner* — Xuxing Chen

(57) ABSTRACT

An electronic device including a power source providing a source voltage, a capacitor, a primary regulator circuit, an always-on load that is active during a low power mode, and a recycle control circuit. The primary regulator circuit receives the source voltage and has an output that maintains a charge on the capacitor during an active mode. The primary regulator circuit does not contribute to a charge on the capacitor during the low power mode. The recycle control circuit includes a select circuit and a select control circuit. The select circuit selects, based on a control signal, between the voltage of the capacitor and at least one supply voltage including or otherwise developed using the source voltage to provide power to the always-on load during the low power mode. The select control circuit provides the control signal to control power provided to the always-on load during the low power mode.

17 Claims, 3 Drawing Sheets

(56) References Cited

U.S. PATENT DOCUMENTS

| | | | | |
|---|---|---|---|---|
| 2011/0074481 A1* | 3/2011 | Lin | ........................ | H02M 3/07 |
| | | | | 327/198 |
| 2011/0111811 A1* | 5/2011 | Juang | ........................ | G06F 1/26 |
| | | | | 455/573 |
| 2012/0271468 A1* | 10/2012 | Doljack | .................. | H02J 9/005 |
| | | | | 700/286 |
| 2014/0355025 A1* | 12/2014 | Gomi | ....................... | H02M 1/36 |
| | | | | 358/1.13 |
| 2016/0197496 A1* | 7/2016 | Rich | ..................... | H01M 10/46 |
| | | | | 320/162 |

OTHER PUBLICATIONS

Kamath, Sandeep et al. "Measuring Bluetooth® Low Energy Power Consumption." Texas Instruments. SWRA347a Apr. 13, 2012. pp. 1-23.

* cited by examiner

RECYCLING CAPACITANCE ENERGY FROM ACTIVE MODE TO LOW POWER MODE

BACKGROUND OF THE INVENTION

Field of the Invention

The present invention relates in general to electronic device energy conservation, and more specifically to recycling the capacitive energy stored during an active mode for use in a low power mode.

Description of the Related Art

Power efficiency is a primary consideration for electronic devices particularly those that have a limited energy source, such as battery-operated devices or those devices that use harvested energy, such as, for example, solar, piezoelectric, biochemical, thermal, etc. Many such devices have a low power mode, such as a sleep mode or the like, to reduce energy consumption during periods of inactivity. For example, in low power microcontroller unit (MCU) devices used for Internet of Things (IoT) applications, the system may have periodic, and often predictable, active and low power modes. Even during the low power mode, energy is consumed to maintain power to certain circuitry, such as, for example, always-on (AON) circuitry and the like. Often, the energy consumed in the low power mode is substantial part of total energy of the system.

BRIEF DESCRIPTION OF THE DRAWINGS

Embodiments of the present invention are illustrated by way of example and are not limited by the accompanying figures, in which like references indicate similar elements. Elements in the figures are illustrated for simplicity and clarity and have not necessarily been drawn to scale.

DETAILED DESCRIPTION

The inventors have recognized that energy developed during an active mode is wasted during a low power mode. They have therefore developed a system and method of using charge on at least one capacitance during the low power mode. A recycle control circuit senses the low power mode and delivers the stored charge to an always-on (AON) load in the system. The charge is used until depleted or for a programmable amount of time. The capacitance may include a physical power supply capacitor or an intrinsic capacitance in the system, such as a load receiving a regulated voltage. In this manner, the energy stored on a capacitor (or other capacitance) during the low power mode is reused by a smart power delivery circuit which ensures switching between the capacitance and the main energy source to achieve optimum energy utilization.

Figure 1:
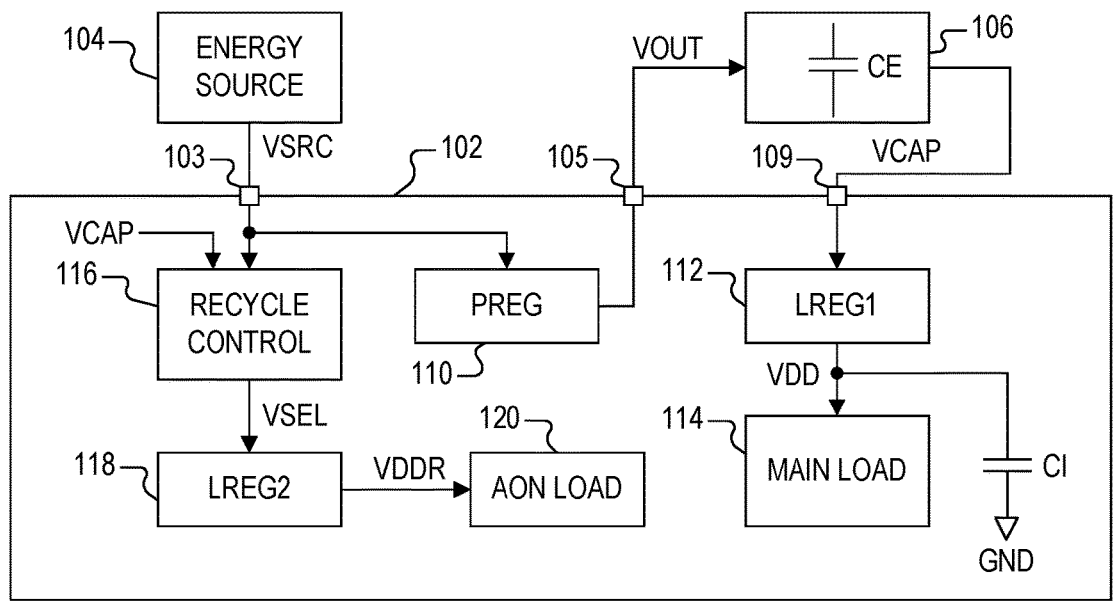
FIG. 1 is a simplified block diagram of an electronic system or device implemented according to a more general embodiment.

FIG. 1 is a simplified block diagram of an electronic system or device 100 implemented according to a more general embodiment. The electronic device 100 includes a main electronic circuit 102, an energy source 104, and an external device circuit 106 which may include one or more external devices including a capacitor CE. The energy source 104 develops and provides a source voltage VSRC to an input pin 103 of the electronic circuit 102, in which VSRC is further provided to a primary regulator (PREG) 110. The primary regulator 110 converts VSRC to an output voltage VOUT, which is provided via an output pin 105 to an input or terminal of the external device circuit 106. VOUT is ultimately used to charge the capacitor CE, which develops a capacitor voltage VCAP provided to another pin 109 of the electronic circuit 102. The electronic circuit 102 includes a linear regulator (LREG1) 112 that receives VCAP and that provides a regulated voltage VDD to an input of a main load 114. An internal or intrinsic capacitance CI of the main load 114 is shown represented as a capacitor coupled between VDD and a supply reference node, such as ground (DGND). The intrinsic capacitance CI is not a separate physical capacitor, but instead is included to represent the intrinsic capacitance of the system including the main load 114.

VSRC and VCAP are also provided to respective inputs of a recycle control circuit 116, which selects an input voltage (e.g., VCAP, VSRC, etc.) and provides a selected voltage VSEL to an input of another linear regulator (LREG2) 118. LREG2 118 provides a regulated voltage VDDR to an input of an always-on (AON) load 120, in which VDDR remains powered during a low power mode. The recycle control circuit 116 may be powered by VSRC, VSEL or even VDDR (if available), since these voltages remain powered during the low power mode.

The energy source 104 may be based on an AC power source or the like generally providing "unlimited" power. The electronic circuit 102, however, may be or may include a low power application in which the energy source 104 is limited. An example of a limited power source is a rechargeable or non-rechargeable battery or set of batteries or one or more battery cells or the like. Another example of a limited power source is a harvested energy system, such as a system based on solar, piezoelectric, biochemical, thermal, etc. Embodiments of the present invention are particularly advantageous for low power devices using a limited energy source.

The primary regulator 110 may be any one of several different types of regulators, such as a DC-DC regulator, a low dropout (LDO) regulator, a linear regulator, etc. DC-DC converters, for example, are often used for power delivery of low power systems to ensure higher power efficiency. A higher power efficiency converter conserves energy and thus may improve battery lifetime in a battery-operated system. A DC-DC converter generally converts an input DC voltage, such as VSRC, to the output DC voltage VOUT, which may have a different voltage level than VSRC. VOUT, for example, may have a voltage level that is less than, greater than, or equal to the voltage level of VSRC. In embodiments in which the energy source 104 incorporates one or more batteries or battery cells or a harvested energy unit, VSRC may vary within a predetermined voltage range, whereas it may be desired to generate a fixed supply voltage level for driving the main load 114 during an active mode. In one embodiment, the primary regulator 110 is a DC-DC converter in which the external device circuit 106 includes an inductor (e.g., inductor L, FIG. 3) coupled to the capacitor CE. In another embodiment, the primary regulator 110 is an LDO regulator in which the capacitor CE is a decoupling capacitor and in which VOUT and VCAP are essentially the same voltage.

LREG1 112 and LREG2 118 may be linear regulators or the like. LREG1 112 is provided to maintain VDD at a constant desired voltage level for the main load 114 during the active mode. LREG2 118 is provided to maintain VDDR at a constant desired voltage level or within a desired voltage range for maintaining power to the AON load 120 during both the active and low power modes. In some embodiments under certain allowable system boundary conditions, LREG2 118 may be eliminated in which the AON load 120 is supplied directly from VSEL.

The electronic circuit 102 may be implemented in a semiconductor chip or integrated circuit (IC) or the like. The electronic circuit 102 may be configured as a system on a chip or system on chip (SOC) or each block may be configured as separate discrete devices. In addition or in the alternative, the main load 114 itself may be configured as an SOC and may be or may otherwise include a low power microcontroller unit (MCU) or the like.

The AON load 120 may control the state of the system for switching between the active and low power modes. The AON load 120 may include, for example, timers, clock circuitry, wakeup logic, reset functions, small control circuitry for controlling state machines, supervisory circuitry (for maintaining sanity and the like, such as controlling functions for transitioning between active and low power modes), housekeeping circuits (such as circuits for reducing surge currents and ensuring proper transition sequencing of operations during power-up indicating when back in active mode), etc.

The recycle control circuit 116 enables VCAP to provide power to the AON load 120 during the low power mode. When a conventional system was placed into the lower power mode, any charge on the capacitor CE, or any other capacitance in the system such as the intrinsic capacitance CI, was not used and was thus wasted. In the conventional configurations, the energy source 104 was used to provide power to the AON load 120 during the low power mode, which may limit the power provided by the energy source 104. It is well known, for example, that battery lifetime is often limited by the energy consumed in the lower power mode for low-duty cycle applications. A low-duty cycle application is one in which the system is awakened periodically for a relatively short period of time to perform a designated operation, and then placed back into the low power mode for a longer period of time.

Figure 2:
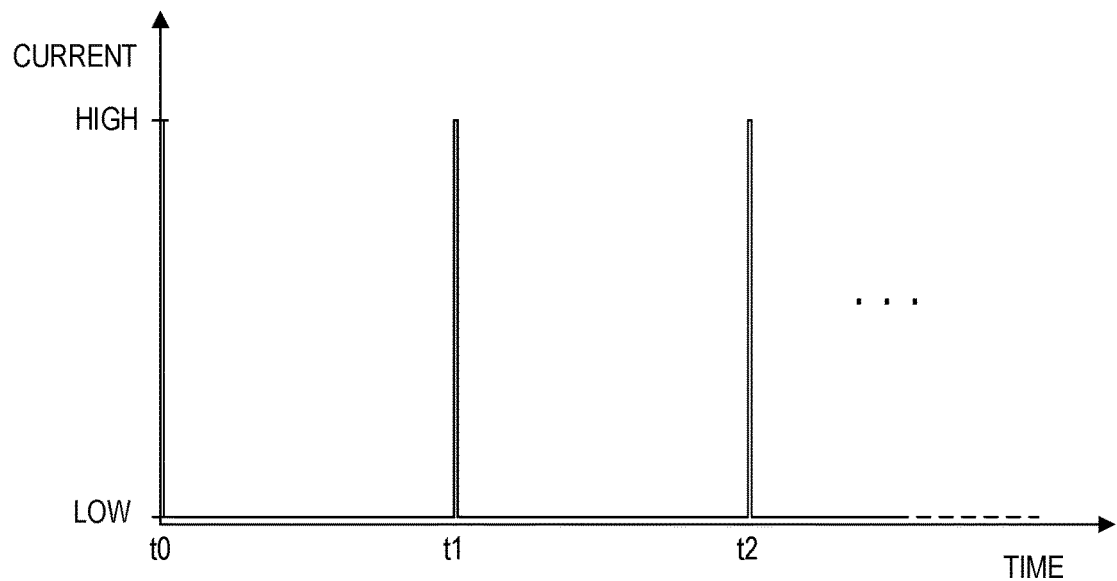
FIG. 2 shows a pair of timing diagrams illustrating operation of the electronic device of FIG. 1 when configured to perform a low-duty cycle application.

FIG. 2 shows a simplified timing diagram illustrating operation of the electronic device 100 when configured to perform a low-duty cycle application. The timing diagram plots normalized current versus time without specific units and is not necessarily drawn to scale. The timing diagram shows periods of high activity at times t0, t1, t2, etc., in which the current spikes to a "HIGH" level during each active period, each followed by long period of low activity in which the current drops to a "LOW" level. Each period of activity is represented as a relatively narrow spike of high current, meaning that the duration of activity is very short as compared to the periods of inactivity. As an example, each period of activity may be as little as 1% or less of the entire duration of each cycle. The LOW level of current during the periods of low activity is also not shown to scale, in which the actual current may be lower than that illustrated. Although each active mode period may consume energy at a greater rate as compared to the low power mode periods, the low power mode duration is substantially longer and thus consumes an appreciable amount of power. In fact, in many embodiments more energy may be consumed during the low power mode.

As a non-limiting example, in one embodiment the active periods may occur on a regular basis, such as every 1 microsecond ($\mu$s), while having a very short duration, such as only about 0.0025 $\mu$s. The LOW current may be very low such as 1 microampere ($\mu$A) or less, whereas the HIGH current may be significantly higher, such as on the order of 20 milliamperes (mA). The embodiment shown in FIG. 2 appears periodic or synchronous, in which the periods of activity occur on a regular basis. Asynchronous embodiments are also contemplated, in which the periods of low power may be non-uniform with variable durations.

There are many low duty-cycle applications that follow a similar pattern as that shown in FIG. 2. Examples include Ultra-Low Power (ULP) domain benchmarks by the Embedded Microprocessor Benchmark Consortium (EMBC) and the like. Other examples include low power Bluetooth low energy (BLE) or ZibBee Internet of Things (IoT) systems in which the system is periodically, and often regularly, placed into one of one or more low power modes with or without data retention. IoT MCU systems are typically designed in such a way that there are one or more high power consuming domains which remain active for short periods of time. The high power domain has high intrinsic capacitance which is charged each time they are active, e.g., the intrinsic capacitance CI. The high power domain may be supplied with a high efficiency DC-DC converter. Additionally, there exist low power consuming domains which remain active for longer periods and are often supplied with a linear regulator, which is less efficient as compared to a DC-DC converter.

The primary regulator 110 charges the capacitor CE and the intrinsic capacitance CI of the circuit during the active mode. The capacitor CE is typically quite large, such as on the order of about 1 microfarad ($\mu$F) or so. In conventional configurations, the charge on the capacitances CE and CI was wasted away and not used. Nonetheless, the AON load 120 remained empowered during the low power mode, which would otherwise consume a substantial level of energy from the energy source 104 in a conventional configuration. The loss of energy becomes significant over time for many applications, including the low duty-cycle applications in which the electronic device 100 spends most of its time in the low power mode.

The recycle control circuit 116, as further described herein, alleviates this problem. The recycle control circuit 116 provides a smart connection between the capacitor CE and the energy source 104. In some embodiments, the recycle control circuit 116 also provides a smart connection between the intrinsic capacitance CI and the energy source 104. The energy stored on the capacitances CE and CI, which would otherwise be wasted, may instead be reused and delivered to the low power domain of the system, such as, for example, the AON load 120 and even a portion of the recycle control circuit 116 itself. The recycle control circuit 116, therefore, lowers the overall load on the energy source 104 especially during low power operation. For battery-operated configurations, the energy used in low power domain is supplied by a high efficiency path, thereby improving the overall battery lifetime.

Figure 3:
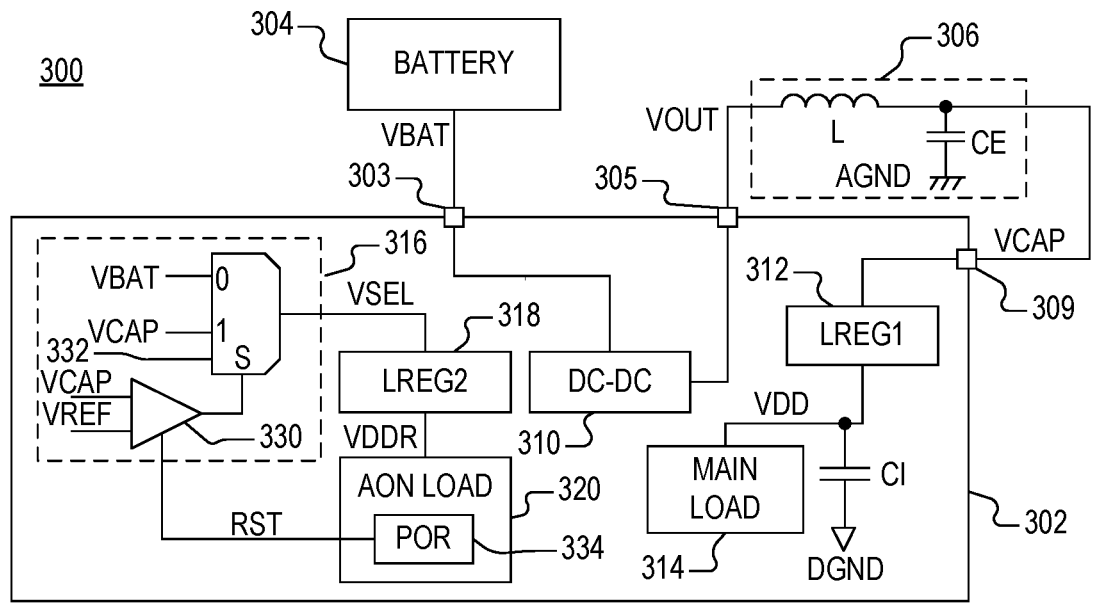
FIG. 3 is a schematic and block diagram of an electronic device implemented according to another embodiment in which charge on an external capacitor is used while above a reference voltage.

FIG. 3 is a schematic and block diagram of an electronic device 300 implemented according to another embodiment. The electronic device 300 includes an electronic circuit 302, a battery 304 as the energy source, and an external device circuit 306 including an inductor L and the capacitor CE. The battery 304 develops and provides a battery voltage VBAT as the main source voltage to an input pin 303 of the electronic circuit 302, in which VBAT is further provided to DC-DC regulator 310 as the primary regulator of the electronic circuit 302. The DC-DC regulator 310 converts VBAT to an output voltage VOUT, which is provided via an output pin 305 of the electronic circuit 302 to one end of the inductor L, having its other end coupled to one end of the capacitor CE at a node developing the capacitor voltage VCAP. The other end of the capacitor CE is coupled to an internal supply reference node, such as DGND. It is noted that DGND inside and AGND outside the electronic circuit 302 are generally at the same reference voltage level. In one embodiment, for example, a GND pin or the like is internally coupled to DGND on the electronic circuit 302 and externally coupled to AGND.

VOUT is ultimately used to charge the capacitor CE, and VCAP is provided to a linear regulator LREG1 312 via a pin 309 of the electronic circuit 302. The linear regulator LREG1 312 develops and provides a regulated voltage VDD to an input of a main load 314 in a similar manner previously described. The intrinsic capacitance CI is coupled between VDD and DGND. VBAT and VCAP are also provided to respect inputs of a recycle control circuit 316, which selects an input voltage (e.g., VCAP, VSRC, etc.) and provides a selected voltage VSEL to an input of another linear regulator LREG2 318. LREG2 318 provides a regulated voltage VDDR to an input of an AON load 320.

The recycle control circuit 316 includes a comparator 330 and an analog multiplexer (MUX) 332, in which each may be powered by VBAT, VSEL, or even VDDR. The comparator 330 has a first input receiving VCAP, a second input receiving a reference voltage VREF, and an output coupled to a select (S) input of the MUX 332. In operation, the comparator 330 compares the voltage levels of VCAP to VREF, and based on the results of the comparison, controls the MUX 332 to select either VBAT or VCAP as the selected voltage VSEL. When the voltage level of VCAP is greater than the voltage level of VREF, then the comparator 330 controls the MUX 332 to select VCAP as VSEL. Otherwise, when the voltage level of VCAP is less than or equal to the voltage level of VREF, the comparator 330 controls the MUX 332 to select VBAT as VSEL. In one embodiment, when VCAP>VREF, then the comparator 330 asserts its output high causing the MUX 332 to select its logic "1" input receiving VCAP as VSEL, and when VCAP<VREF, then the comparator 330 asserts its output low causing the MUX 332 to select its logic "0" input receiving VBAT as VSEL. The comparator 330 may be configured to also select VBAT as VSEL when VCAP and VREF are equal or very close to each other, or when VCAP≅VREF.

VREF is selected to have a voltage level that is at or slightly greater than the minimum operating voltage level of the AON load 320. In this manner, as long as VCAP>VREF, even during the active mode, VCAP is selected to provide power to the AON load 320. Since the capacitor CE is fully charged during the active mode, the voltage level of VCAP is greater than VREF and thus is selected to provide power to the AON load 320. This is advantageous since the capacitor CE is charged by the DC-DC regulator 310, which is the most efficient path for providing power in the system. When the mode is switched to the low power mode, the charge on the capacitor CE is initially sufficient to keep the voltage level of VCAP above VREF, so that the charge on the capacitor CE continues to provide power to the AON load 320. If the capacitor CE is sufficiently large, then it may have sufficient charge to provide power to the AON load 320 and the recycle control circuit 316 during the entire duration of the low power mode. Although not explicitly shown, VCAP may also power the recycle control circuit 316 during the low power mode. If for any reason the voltage level of VCAP falls to the voltage level of VREF during the low power mode, then the comparator 330 switches and switches the MUX 332 to select VBAT to provide power to the AON load 320, so that operation remains uninterrupted. The DC-DC converter 310 is turned back on at the next active mode to recharge the capacitor CE causing the comparator 332 and the MUX 332 to switch back to VCAP.

The comparator 330 may be configured upon power on or reset of the electronic circuit 302 to hold its output low in order to control the MUX 332 to select VBAT as default on startup. In addition or in the alternative, the AON load 320 may include a power-on reset (POR) circuit 334 for ensuring proper operation upon startup or reset of the electronic circuit 302. The POR circuit 334 may provide a reset (RST) signal to hold the output of the comparator 330 low in order to control the MUX 332 to select VBAT as default on startup. Thereafter, during the active and low power modes, the comparator 330 controls the MUX 332 based on the comparison between VCAP and VREF as previously described.

Figure 4:
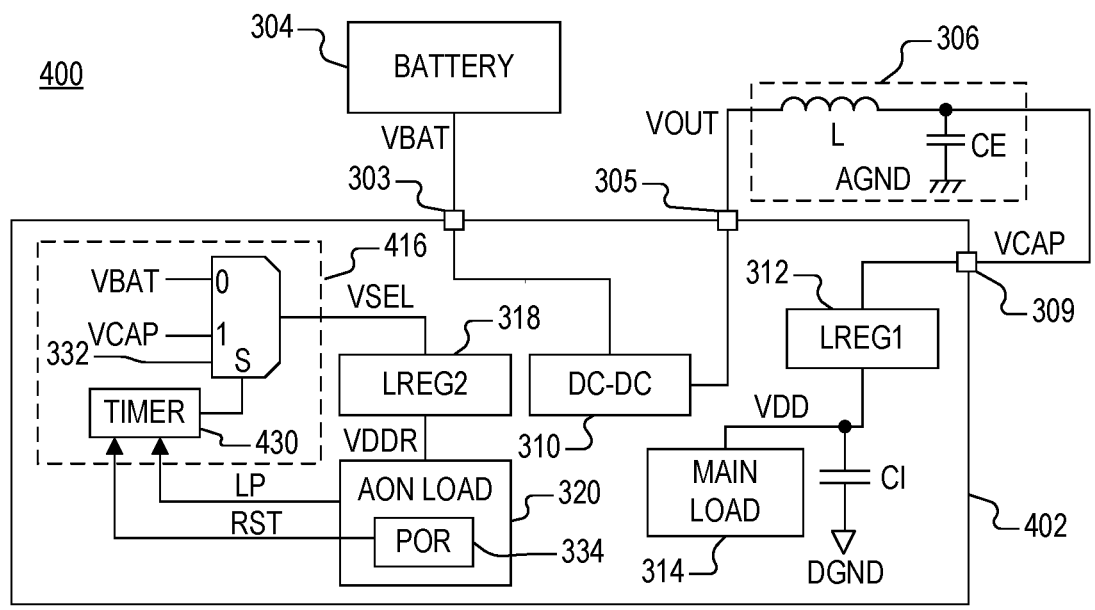
FIG. 4 is a schematic and block diagram of an electronic device implemented according to another embodiment in which charge on an external capacitor is used for a programmed time period.

FIG. 4 is a schematic and block diagram of an electronic device 400 implemented according to another embodiment. The electronic device 400 is similar to the electronic device 300 in which similar or even identical components assume identical reference numerals. In this case, the electronic device 400 includes an electronic circuit 402, which includes similar components as the electronic circuit 302 except that the recycle control circuit 316 is replaced by a recycle control circuit 416. Furthermore, the recycle control circuit 416 is similar to the recycle control circuit 316, except that the comparator 330 is replaced by a timer 430. The AON load 320 provides a low power (LP) signal to the timer 430 to indicate when entering the low power mode. The timer 430 may also receive the RST signal from the POR circuit 334 in a similar manner previously described.

In operation of the electronic device 400, the timer 430 holds its output low when RST is asserted (during POR) and during the active mode, causing the MUX 332 to select VBAT as VSEL providing power to the AON load 320. When AON load 320 asserts LP when entering the low power mode, LP triggers the timer 430 to assert its output high. When the output of the timer 430 is asserted high, the MUX 332 selects VCAP as VSEL providing power to the AON load 320. After a fixed, programmable or adaptive time (for different applications), the timer 430 times out and switches the MUX 332 back to select VBAT. Here, adaptivity can be incorporated by observing or otherwise predicting energy consumption in low power mode, such as, for example, by task mapping and leakage sensor or temperature sensor monitoring. Generally, the timeout value of the timer 430 is selected to ensure that the capacitor CE has sufficient charge to provide power to the AON load 320 for a maximum period of time during the low power mode.

Figure 5:
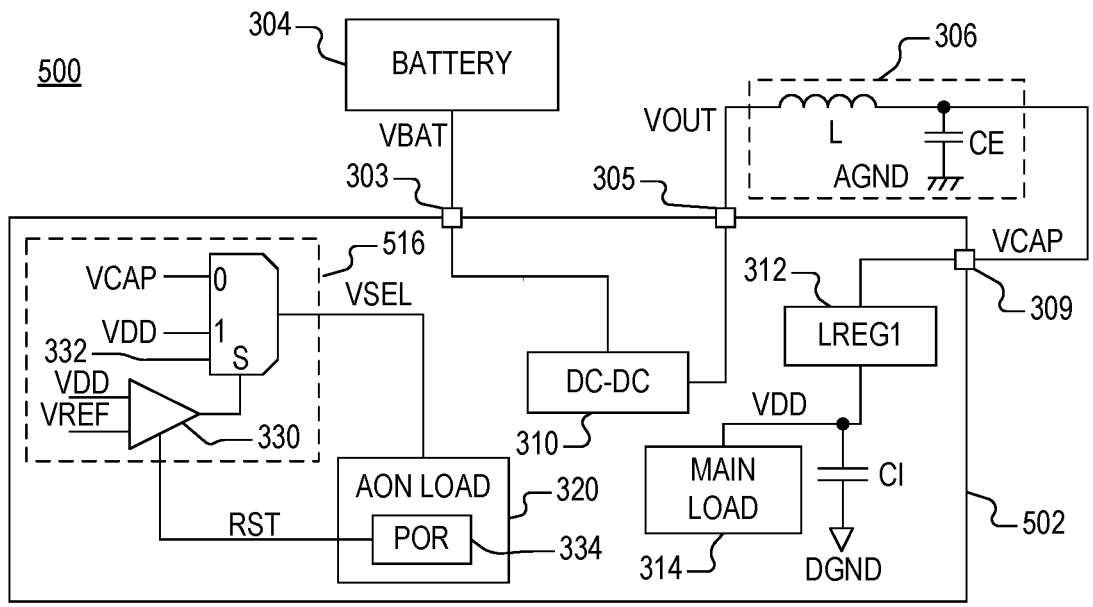
FIG. 5 is a schematic and block diagram of an electronic device implemented according to another embodiment in which charge on an intrinsic capacitance is used while above a reference voltage and otherwise charge on an external capacitor is used.

FIG. 5 is a schematic and block diagram of an electronic device 500 implemented according to another embodiment. The electronic device 500 is similar to the electronic device 300 in which similar or even identical components assume identical reference numerals. In this case, the electronic device 500 includes an electronic circuit 502, which includes similar components as the electronic circuit 302 except that the recycle control circuit 316 is replaced by a recycle control circuit 516 and the linear regulator 318 is omitted. Also the recycle control circuit 516 is similar to the recycle control circuit 316 including the comparator 330 and the MUX 332, except that the comparator compares VREF with VDD (rather than VCAP), the logic "0" input of the MUX 332 receives VCAP instead of VBAT, and the logic "1" input of the MUX 332 receives VDD instead of VCAP. Although not explicitly shown, VBAT may provide power to the recycle control circuit 516.

In this case, VREF is selected to have a voltage level indicative of the minimum operating voltage level of VDD. VDD has a high voltage level during the active mode, and discharges low via the intrinsic capacitance CI of the main load 314 during the low power mode. In this case VDD is higher than VREF during the active mode so that the MUX 332 selects VDD as VSEL to provide power to the AON load 320. When switched to the low power mode, VDD is the voltage across the intrinsic capacitance CI which discharges into the AON load 320. When the intrinsic capacitance CI discharges so that VDD falls to VREF, the comparator 330 switches to select VCAP as VSEL to power the AON load 320 during the remaining duration of the low power mode.

In the case of the electronic circuit 502, the capacitor CE may be made sufficiently large to supply power to the AON load 320 for the duration of the low power mode. Nonetheless, the charge on the intrinsic capacitance CI may be utilized during the initial portion of the low power mode. The linear regulator 318 is omitted, so that VSEL directly powers the AON load 320. If system boundary conditions are such that VSEL may not be used directly, then the linear regulator 318 may be included to convert VSEL to VDDR. The POR circuit 334 may provide RST to hold the output of the comparator 330 low in order to control the MUX 332 to select VCAP as default on startup. It is noted that many circuits in the AON load 320 may be powered by VBAT, such as a battery voltage monitor, bandgap circuits, etc. Also, VBAT may be provided as a failsafe option in the event VCAP is less than a minimum voltage level.

Figure 6:
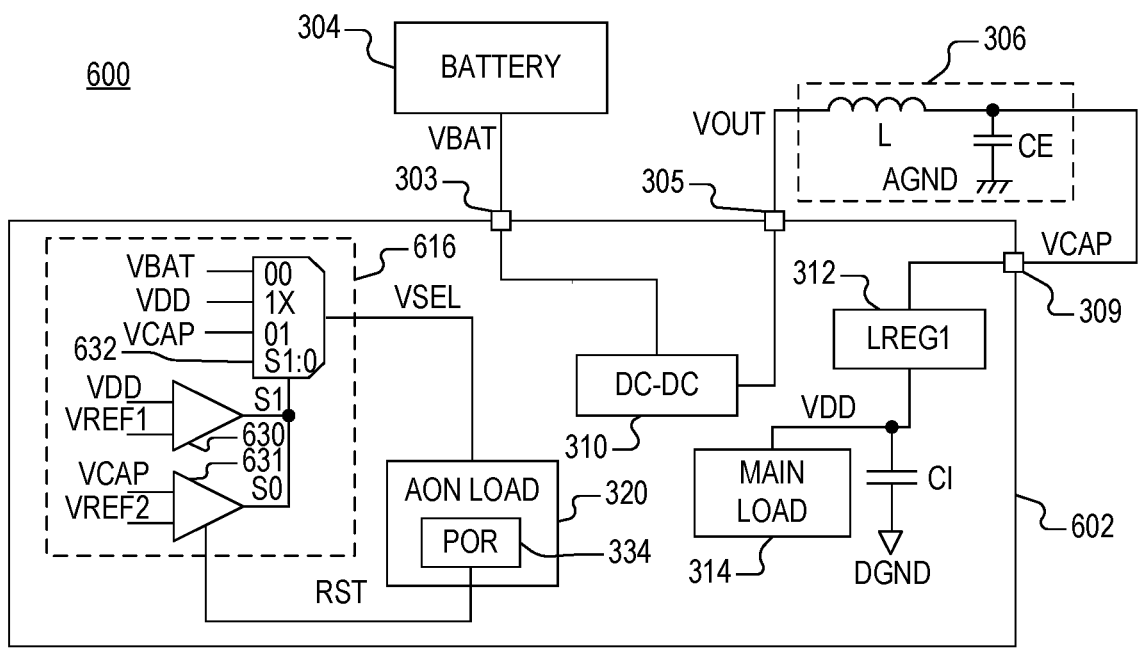
FIG. 6 is a schematic and block diagram of an electronic device implemented according to a combination of the embodiments of FIGS. 3 and 6.

FIG. 6 is a schematic and block diagram of an electronic device 600 implemented according to another embodiment. The electronic device 600 is similar to the electronic device 300 in which similar or even identical components assume identical reference numerals. In this case, the electronic device 600 includes an electronic circuit 602, which includes similar components as the electronic circuit 302 except that the recycle control circuit 316 is replaced by a recycle control circuit 616 and the linear regulator 318 is omitted. The recycle control circuit 616 includes a first comparator 630, a second comparator 631 and a MUX 632. The first comparator 630 compares VDD with a first reference voltage VREF1 for developing a first select signal S1, and the second comparator 631 compares VCAP with a second reference voltage VREF2 for developing a second select signal S0. VREF1 is a minimum level of VDD, and VREF2 is a minimum level needed for the AON load 320. S1 and S0 are provided as a 2-bit select value to a 2-bit select input S1:0 (or S1:S0) of the MUX 632. The MUX 632 receives VBAT at a binary input 00, VCAP at a binary input 01, and VDD at a binary input 1X, in which "X" denotes "don't care" so that VDD may be selected provided to both binary inputs 10 and 11.

In operation, during the active mode when VDD is high above VREF1, then VDD is selected as VSEL at the output of the MUX 632. When operation switches to the low power mode, the intrinsic capacitance CI is discharged during the initial portion of the lower power mode. When VDD goes low below VREF1, S1 switches so that VCAP is selected as VSEL while VCAP is greater than VREF2. The recycle control circuit 616 of the electronic circuit 602 is essentially a combination of the other recycle control circuits 316 and 516. In this case, both capacitances CI and CE may be used to provide power to the AON load 320 during a portion up to the entire duration of the low power mode.

The embodiments described herein are particularly advantageous for systems that are duty-cycled between active and low power modes where most energy is consumed in the low power modes. Such systems may include, for example, MCU systems based on BLE or Zigbee or the like with or without integrated DC-DC or an LDO using an external capacitor loaded during the active mode of the system. The various configurations reuse the energy stored on one or both external or internal capacitance during low power mode of the system. The configurations include a smart power delivery scheme which ensures switching between the charged capacitance and energy source (e.g., battery) for optimum energy utilization. This scheme may be applied to the energy stored on the external capacitor, and also on the intrinsic capacitance of the main power domain that is shut-off during the low power mode. The always-on portion of the system may be fully or partially supplied by the energy stored on the charged capacitance.

A preliminary evaluation may be made to determine the amount of time that the selected capacitor provides power to the low power domain load during the low power mode. The time of discharge $T_{DCH}$ is calculated as $T_{DCH}=C^*(VA-VM)/I_{LP}$, in which C is the capacitance of the selected capacitor, VA is the minimum voltage of the selected capacitor during the active mode, VM is the minimum allowed voltage during the low power mode, and $I_{LP}$ is the current consumption during the low power mode. When the duration of the low power mode is known, which is usually is for many configurations, then the above relationship may be used to determine the capacitance C of the capacitor CE sufficient to provide power for the entire low power duration.

An electronic device according to one embodiment includes a power source providing a source voltage, a capacitor having a capacitor voltage, a primary regulator circuit, an always-on load that is active during a low power mode, and a recycle control circuit. The primary regulator circuit has an input receiving the source voltage and has an output that maintains a charge on the capacitor during an active mode. The primary regulator circuit does not contribute to the charge on the capacitor during the low power mode. The recycle control circuit includes a select circuit and a select control circuit. The select circuit selects, based on a control signal from the select control circuit, between the capacitor voltage and at least one supply voltage including or otherwise developed using the source voltage to provide power to the always-on load during the low power mode. The select control circuit provides the control signal to control power provided to the always-on load during the low power mode.

The select circuit may select between the source voltage and the capacitor voltage. In one embodiment, the select control circuit includes a comparator that compares the capacitor voltage with a predetermined reference voltage and that provides the control signal indicative thereof. In another embodiment, the select control circuit includes a timer that provides the control signal based on a timeout value.

The intrinsic capacitance of the system may also be discharged to the always-on load. In one embodiment, the electronic device includes a secondary regulator having an input receiving the capacitor voltage and having an output providing a regulated voltage on a regulated voltage node coupled to an intrinsic capacitance that charges to the regulated voltage during the active mode. In this case, the select circuit may select between the capacitor voltage and the regulated voltage node (charged by the intrinsic capacitance) to provide power to the always-on load during the low power mode.

The primary regulator may be a DC-DC regulator, a low dropout regulator, or a linear regulator or the like. The DC-DC regulator charges the capacitor through an inductive device. The select circuit may include a multiplexer or the like.

An integrated circuit that recycles energy from a capacitor during a low power mode according to one embodiment includes a power input receiving a source voltage, a capacitor input receiving a capacitor voltage, a regulator output, a primary regulator circuit, an always-on load, and a recycle circuit. The primary regulator circuit has an input coupled to the power input and has an output coupled to the regulator output, in which the primary regulator circuit provides a DC voltage via the regulator output for maintaining a charge on the capacitor during the active mode. The recycle control circuit includes a select circuit and a select control circuit as previously described.

A method of recycling energy from a capacitance during a low power mode of an electronic device according to one embodiment includes charging a capacitance during an active mode, and discharging the capacitance into an always-on load so that the always-on load remains powered during the low power mode of the electronic device.

The method may include comparing a voltage of the capacitance with a predetermined reference voltage, and selecting the capacitance to discharge into the always-on load any time the capacitance voltage is greater than the predetermined reference voltage during the active and low power modes. The method may include discharging the capacitance into the always-on load during the low power mode for up to a predetermined time period. The method may include charging a capacitor to develop a capacitor voltage, developing a regulated voltage using the capacitor voltage during the active mode, and charging an intrinsic capacitance with the regulated voltage, comparing a voltage level of the regulated voltage with a predetermined reference voltage, and discharging the intrinsic capacitance into the always-on load while the voltage level of the regulated voltage is above the predetermined reference voltage, and discharging the capacitor into the always-on load when the voltage level of the regulated voltage falls below the predetermined reference voltage.

The method may include charging a capacitor to develop a capacitor voltage, developing a regulated voltage using the capacitor voltage during the active mode, and charging an intrinsic capacitance with the regulated voltage, comparing a voltage level of the regulated voltage with a first predetermined reference voltage, comparing the capacitor voltage with a second predetermined reference voltage, and discharging the intrinsic capacitance into the always-on load while the voltage level of the regulated voltage is above the first predetermined reference voltage, and discharging the capacitor into the always-on load when the voltage level of the regulated voltage falls below the first predetermined reference voltage and while the capacitor voltage is above the second predetermined reference voltage.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive logic or negative logic may be used in various embodiments in which the present invention is not limited to specific logic polarities, device types or voltage levels or the like. The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. An electronic device, comprising:
   a power source providing a source voltage;
   a capacitor having a capacitor voltage;
   a primary regulator circuit having an input receiving said source voltage and having an output that maintains a charge on said capacitor during an active mode and that does not contribute to said charge on said capacitor during a low power mode;
   an always-on load that is active during said low power mode; and
   a recycle control circuit, comprising:
      a select circuit that selects, based on a control signal, between said capacitor voltage and at least one supply voltage including or otherwise developed using said source voltage to provide power to said always-on load during said low power mode; and
      a select control circuit that provides said control signal to control power provided to said always-on load during said low power mode.

2. The electronic device of claim 1, wherein said select circuit selects between said source voltage and said capacitor voltage, and wherein said select control circuit comprises a comparator that compares said capacitor voltage with a predetermined reference voltage and provides said control signal indicative thereof.

3. The electronic device of claim 1, wherein said select circuit selects between said source voltage and said capacitor voltage, and wherein said select control circuit comprises a timer that provides said control signal based on a timeout value.

4. The electronic device of claim 1, further comprising an always-on regulator having an input receiving a selected voltage at an output of said select circuit and having an output providing a regulated voltage to said always-on load.

5. The electronic device of claim 1, further comprising:
   a secondary regulator having an input receiving said capacitor voltage and having an output providing a regulated voltage on a regulated voltage node coupled to an intrinsic capacitance that charges to said regulated voltage during said active mode;

wherein said select circuit selects between said capacitor voltage and said regulated voltage node to provide power to said always-on load during said low power mode; and wherein said select control circuit comprises a comparator that compares a voltage on said regulated voltage node with a predetermined reference voltage and that provides said control signal indicative thereof.

6. The electronic device of claim 1, further comprising:

a secondary regulator having an input receiving said capacitor voltage and having an output providing a regulated voltage on a regulated voltage node coupled to an intrinsic capacitance that charges to said regulated voltage during said active mode;

wherein said select circuit selects between said capacitor voltage, said regulated voltage node and said source voltage to provide power to said always-on load during said low power mode; and wherein said select control circuit comprises:

a first comparator that compares a voltage of said regulated voltage node with a first predetermined reference voltage and provides a first select signal indicative thereof; and a second comparator that compares said capacitor voltage with a second predetermined reference voltage and provides a second select signal indicative thereof;

wherein said control signal comprises said first and second select signals.

7. The electronic device of claim 1, wherein said primary regulator comprises a DC-DC regulator that charges said capacitor through an inductive device.

8. The electronic device of claim 1, wherein said primary regulator comprises a low dropout regulator and where said capacitor comprises a decoupling capacitor.

9. The electronic device of claim 1, wherein said select circuit comprises an analog multiplexer and wherein said select control circuit comprises a comparator that provides said control signal to a select input of said multiplexer.

10. An integrated circuit that recycles energy from a capacitor during a low power mode, comprising:

a power input receiving a source voltage;
a capacitor input receiving a capacitor voltage;
a regulator output;
a primary regulator circuit having an input coupled to said power input and having an output coupled to said regulator output, wherein said primary regulator circuit provides a DC voltage via said regulator output for maintaining a charge on the capacitor during an active mode, and said primary regulator circuit does not provide said DC voltage during said low power mode;
an always-on load that is active during said low power mode; and
a recycle control circuit, comprising:
a select circuit that selects, based on a control signal, between said capacitor voltage and at least one supply voltage including or otherwise developed using said source voltage to provide power to said always-on load during said low power mode; and
a select control circuit that provides said control signal to control power provided to said always-on load during said low power mode.

11. The integrated circuit of claim 10, wherein said select circuit selects between said source voltage and said capacitor voltage, and wherein said select control circuit comprises a comparator that compares said capacitor voltage with a predetermined reference voltage and provides said control signal indicative thereof.

12. The integrated circuit of claim 10, wherein said select circuit selects between said source voltage and said capacitor voltage, and wherein said select control circuit comprises a timer that provides said control signal based on a timeout value.

13. The integrated circuit of claim 10, further comprising an always-on regulator having an input receiving a selected voltage at an output of said select circuit and having an output providing a regulated voltage to said always-on load.

14. The integrated circuit of claim 10, further comprising:

a secondary regulator having an input receiving said capacitor voltage and having an output coupled to a regulated voltage node coupled to an intrinsic capacitance;

wherein said select circuit selects between said capacitor voltage and said regulated voltage node to provide power to said always-on load during said low power mode; and wherein said select control circuit comprises a comparator that compares a voltage of said regulated voltage node with a predetermined reference voltage and that provides said control signal indicative thereof.

15. The integrated circuit of claim 10, further comprising:

a secondary regulator having an input receiving said capacitor voltage and having an output coupled to a regulated voltage node coupled to an intrinsic capacitance;

wherein said select circuit selects between said capacitor voltage, said regulated voltage node and said source voltage to provide power to said always-on load during said low power mode; and wherein said select control circuit comprises:

a first comparator that compares a voltage of said regulated voltage node with a first predetermined reference voltage and provides a first select signal indicative thereof; and a second comparator that compares said capacitor voltage with a second predetermined reference voltage and provides a second select signal indicative thereof;

wherein said control signal comprises said first and second select signals.

16. A method of recycling energy from a capacitance during a low power mode of an electronic device, comprising:

charging a capacitance during an active mode;
discharging the capacitance into an always-on load so that the always-on load remains powered during the low power mode of the electronic device;
said charging a capacitance comprising charging a capacitor to develop a capacitor voltage, developing a regulated voltage using the capacitor voltage during the active mode, and charging an intrinsic capacitance with the regulated voltage;
comparing a voltage level of the regulated voltage with a predetermined reference voltage; and
wherein said discharging the capacitor into the always-on load during the low power mode comprises discharging the intrinsic capacitance into the always-on load while the voltage level of the regulated voltage is above the predetermined reference voltage, and discharging the capacitor into the always-on load when the voltage level of the regulated voltage falls below the predetermined reference voltage.

17. A method of recycling energy from a capacitance during a low power mode of an electronic device, comprising:
- charging a capacitance during an active mode;
- discharging the capacitance into an always-on load so that the always-on load remains powered during the low power mode of the electronic device;
- said charging a capacitance comprising charging a capacitor to develop a capacitor voltage, developing a regulated voltage using the capacitor voltage during the active mode, and charging an intrinsic capacitance with the regulated voltage;
- comparing a voltage level of the regulated voltage with a first predetermined reference voltage;
- comparing the capacitor voltage with a second predetermined reference voltage; and
- wherein said discharging the capacitor into an always-on load during a low power mode comprises discharging the intrinsic capacitance into the always-on load while the voltage level of the regulated voltage is above the first predetermined reference voltage, and discharging the capacitor into the always-on load when the voltage level of the regulated voltage falls below the first predetermined reference voltage and while the capacitor voltage is above the second predetermined reference voltage.

* * * * *